(12) United States Patent
Ulko et al.

(10) Patent No.: US 12,378,632 B2
(45) Date of Patent: Aug. 5, 2025

(54) BAUXITE PROCESSING METHOD

(71) Applicants: Johann Eirich, Ruppertshofen (DE); Vitali Welmann, Schwaebisch Gmuend (DE)

(72) Inventors: Boris Nikolaevich Ulko, Kaliningrad (RU); Johann Eirich, Ruppertshofen (DE); Vitali Welmann, Schwaebisch Gmuend (DE)

( * ) Notice: Subject to any disclaimer, the term of this patent is extended or adjusted under 35 U.S.C. 154(b) by 694 days.

(21) Appl. No.: 17/612,457

(22) PCT Filed: Feb. 28, 2020

(86) PCT No.: PCT/RU2020/050029
§ 371 (c)(1),
(2) Date: Nov. 18, 2021

(87) PCT Pub. No.: WO2020/242347
PCT Pub. Date: Dec. 3, 2020

(65) Prior Publication Data
US 2022/0243300 A1 Aug. 4, 2022

(30) Foreign Application Priority Data
May 28, 2019 (RU) .................. 2019116365

(51) Int. Cl.
*C22B 3/22* (2006.01)
*B01J 8/14* (2006.01)
*C01F 7/46* (2006.01)
*C22B 21/02* (2006.01)

(52) U.S. Cl.
CPC .................. *C22B 3/22* (2013.01); *B01J 8/14* (2013.01); *C01F 7/46* (2013.01); *C22B 21/02* (2013.01)

(58) Field of Classification Search
CPC ....... C22B 3/22; C22B 21/02; C22B 21/0007; C22B 3/00; B01J 8/14; C01F 7/46; C01F 7/0613

USPC ................................... 75/10, 10.67
See application file for complete search history.

(56) References Cited

U.S. PATENT DOCUMENTS 8,475,664 B2 * 7/2013 Keyser .................. C10G 1/047
210/801

FOREIGN PATENT DOCUMENTS

| JP | H 06-340934 A | 12/1994 |
| JP | 2012-241247 A | 12/2012 |
| JP | 2015-214755 A | 12/2015 |
| RU | 2096327 C1 | 11/1997 |
| RU | 2494965 C1 | 10/2013 |
| RU | 2505362 C2 | 1/2014 |
| RU | 2588910 C1 * | 7/2016 |
| RU | 2613983 C1 | 3/2017 |

OTHER PUBLICATIONS

Aniziol, A Comprehensive List of Ferromagnetic Materials, Moley Magnetics Inc. Dec. 22, 2020 (Year: 2020).*
Brian Campbell, What is pH?, Wastewater Digest, Jun. 2024 (Year: 2024).*
Globe Core, Rotating Electromagnetic Field Machine Texas Tornado Vortex Layer Device AVS 100, Jun. 2024 (Year: 2024).*
RU2588910 C1 Translation (Year: 2016).*

* cited by examiner

*Primary Examiner* — Danielle M. Carda
(74) *Attorney, Agent, or Firm* — Hoffmann & Baron, LLP

(57) ABSTRACT

A bauxite processing method including: preliminarily grinding bauxites; mixing the bauxites as ground with magnetic field treated water into a pulp; exposing the pulp in a reaction chamber to a rotating magnetic field created by rotating ferromagnetic elements, carried out in a vortex layer generated by ferromagnetic elements rotating at a speed of at least 2800 rpm, to achieve a magnetoelastic effect and provide forces and energies which enable metal reduction; and separating a resulting metal oxide mixture.

10 Claims, No Drawings

BAUXITE PROCESSING METHOD

CROSS-REFERENCE TO RELATED APPLICATIONS

The present application is the U.S. National Phase of PCT/RU2020/050029, filed on 28 Feb. 2020, which claims priority to Russian Patent Application No. 2019116365, filed on 28 May 2019, the entire contents of which are incorporated herein by reference.

BACKGROUND

Technical Field

The invention relates to the field of chemical and metal industry and may be used for bauxite processing.

Related Art

Prior art method for bauxite processing into alumina is known (Russian invention patent No. 2494965, published 10 Oct. 2013), including grinding bauxite in a cycling solution, solvent extraction, condensation resulting in aluminate solution and red mud, washing red mud, decomposition of aluminate solution resulting in aluminum hydroxide and mother solution, evaporation of mother solution resulting in a cycling solution, and calcination of aluminum hydroxide, resulting in alumina, wherein slurry resulting from the grinding of the bauxite in the cycling solution is heated to remove water from the cycling solution and obtain a dry residue, the evaporated water is condensed, added to the dry residue and forwarded to solvent extraction, and, after the condensation operation, the aluminate solution is subjected to desilication operation resulting in white mud and aluminate solution which is then forwarded to the decomposition operation.

The prior art method has a drawback which consists in a complicated process of bauxite processing, as well as in the use of alkali in the process chain.

Prior art method for obtaining alumina from chromiferous bauxites is known (Russian invention patent No. 2613983, published 22 Mar. 2017), including wet batch sintering, solvent extraction of sintered material with flush water to produce aluminate solutions, from which aluminum hydroxide is extracted, wherein bauxite is subjected to wet grinding separately from the limestone in an evaporated soda cycling solution at a volume ratio of W:T=3:1, resulting in a pulp with a particle size smaller than 0.05 mm, the pulp being then subjected to magnetic separation to obtain magnetic and non-magnetic products, after which the magnetic product with chromium oxide content of 25% to 30% is forwarded for processing into sodium chromate, and the non-magnetic product with limestone fines and fresh soda is forwarded for batch correction, after which the batch is sintered, the resulting sintered material is subjected to solvent extraction with flush water to produce aluminate solutions, from, which aluminum hydroxide is extracted, then aluminum hydroxide is filtered, washed and forwarded for calcination.

The prior art method has drawbacks which consist in a complicated process of bauxite processing, bulkiness of the process chain, as well as use of reagents in the process chain.

Prior art method for obtaining non-organic hydraulic binders from a man-made and/or natural material or a combination thereof, at least one arbitrary material (Russian invention patent No. 2505362, published 27 Jan. 2014), being selected from a group including solid products produced by burning solid fuels, metallurgical slag, bauxite or limestone, is subjected to physical treatment consisting in exposure to at least one power pulse with transmitting mechanical energy Etk to the processed material particles by applying a force of 50 N to 3.105 N in relation to 1 g of the processed material, during a very short time in the range from $1 \cdot 10^{-6}$ sec to $1 \cdot 10^{-2}$ sec, and/or magnetic energy Etm of a variable magnetic field with a frequency of 150 Hz to $15 \cdot 10^6$ Hz and magnetic field induction of $10^{-2}$ T to $10^3$ T.

The prior art method has drawbacks such as a complicated structure of generating several kinds of energies, which requires different technical apparatus to produce these energies, wherein these energies, i.e., mechanical, magnetic, and wave energies are applied separately, in view of which the implementation of this method is technically complicated.

Prior art method for extracting a magnetic substance from an alumina containing ore is known (Patent application No. JPH06340934A, published 13 Dec. 1994), which is considered as the closest prior art and includes a step of bauxite grinding, a step of ground bauxite separation by particle size, separation of material with a large particle size and its further grinding to achieve particle size smaller than 50 μm, preferably about 10 μm or smaller, after which a step of ground bauxite dispersion in an alkali solution with pH of 9 to 12 is performed, after which a step of magnetic separation is performed with a magnetic field strength of 1 to 10 kilogram-force.

The prior art method has drawbacks which consist in a complicated bauxite processing process and in the use of alkali in the method.

Among the drawbacks which are common for the technical solutions described above, including the closest prior art, are a complicated process of bauxite processing, bulkiness of process schemes, use of different technological apparatus requiring the generation of different forces and energies, need for use of alkali in the technological chain. Besides, a significant drawback of the prior art technical solutions consists in producing a large amount of red mud, which is an ecologically unsustainable by-product.

SUMMARY

Technical Problem

Thus, the claimed invention resolves the technical problem which consists in complicated processing of bauxites.

The technical result achieved by the claimed invention consists in simplifying the process of bauxite processing while improving the efficiency of the process.

Solution of the Problem

The above-mentioned technical result is achieved by a bauxite processing method which includes: preliminarily grinding bauxites; mixing the bauxites as ground with magnetic field treated water into a pulp; exposing the pulp in a reaction chamber to a rotating magnetic field created by rotating ferromagnetic elements, carried out in a vortex layer with the ferromagnetic elements rotating at a speed of at least 2800 rpm, to achieve a magnetoelastic effect and provide forces and energies which enable metal reduction; and separating a resulting metal oxide mixture.

In a further aspect, the claimed technical solution is characterized in that preliminarily grinding bauxites is carried out to achieve a particle size which is smaller than a diameter of the ferromagnetic elements.

In a further aspect, the claimed technical solution is characterized in that a length of the ferromagnetic elements is defined in a range of 5 mm to 30 mm, and a diameter of 1 mm to 2 mm.

In a further aspect, the claimed technical solution is characterized in that the ferromagnetic elements are made of nickel and coated with plastic.

In a further aspect, the claimed technical solution is characterized in that the ferromagnetic elements are made of a neodymium-iron-boron alloy and coated with plastic.

In a further aspect, the claimed technical solution is characterized in that a pH value of the magnetic field treated water is at least 7 units.

In a further aspect, the claimed technical solution is characterized in that a viscosity of the pulp is not more than 2.25 mPas.

In a further aspect, the claimed technical solution is characterized in that vortex layer machines or process activation devices are used to generate the rotating magnetic field and the vortex layer.

In a further aspect, the claimed technical solution is characterized in that separating the resulting metal oxide mixture is carried out in cyclone separators.

In a further aspect, the claimed technical solution is characterized in that cyclone separation is carried out in an inert gas environment in sealed containers, which include a permissible amount of oxygen.

Advantageous Effects

The combination of steps of the claimed method as suggested is aimed at extracting target products from bauxites without generating waste (red mud).

DETAILED DESCRIPTION

Preliminary grinding of bauxites is carried out by any method which is known from the prior art, for example, in a globe mill or a spindle breaker, to achieve a particle size that is smaller than a diameter of the ferromagnetic elements. The specified particle size of bauxites improves the efficiency of their processing. In case the particle size of the bauxites is greater than a diameter of the ferromagnetic elements, no target product reduction process takes place.

Magnetic treatment of water is carried out in order to increase its pH value. Besides, magnetic treatment of water causes a continuous hydrogen ion emission in the rotating magnetic field in the reaction chamber, which provides conditions for the metal reduction process and metal oxide generation at a subsequent step. After magnetic treatment, water pH value is at least 7 units, which contributes to electrolysis process at the step of exposing the pulp to the rotating magnetic field. When water pH value is less than 7 units, electrolysis process is stopped, complicating extraction of metal oxides contained in the bauxites without the electrolysis process.

Subsequent mixing of the bauxites as ground with magnetic field treated water is carried out while monitoring viscosity of a resulting pulp. Viscosity of the pulp should not exceed 2.25 mPas. Increase in the viscosity affects the rotation speed of ferromagnetic elements and, hence, the generated vortex layer. If the viscosity is greater than 2.25 mPas, mobility of the pulp at the step of exposing it to a rotating magnetic field is adversely affected, thus slowing down the physicochemical processes in the reaction chamber.

By virtue of the process of bauxite processing in a vortex layer, when rotation speed of ferromagnetic elements is at least 2800 rpm until a magnetoelastic effect is achieved and forces and energies which enable metal reduction are produced, extraction of target products from the bauxites is realized, while eliminating a double electric layer. When the pulp is exposed to the rotating magnetic field produced by the rotating ferromagnetic elements which rotate at a speed of at least 2800 rpm, the magnetoelastic effect is achieved in the reaction chamber, and the following forces and energies are produced:

acoustic waves;
magnetohydraulic pulse (surge);
thermal energy;
sound waves;
mechanical cavitation;
hydrodynamic cavitation;
acoustic cavitation;
surge mechanic force;
friction mechanic force; and
ultrasound.

Besides the aforementioned forces and energies, the processing involves:

centrifugal force from the rotation of ferromagnetic elements;
centrifugal force from pulp rotation;
electromagnetic waves; and
electrolysis process.

The above-mentioned processes take place simultaneously and affect the chemical compounds contained in the bauxites, resulting in metal oxides. Rotation speed of the ferromagnetic elements should be at least 2800 rpm, and in a preferred embodiment of the method it should be at least 3000 rpm. At this predetermined speed, all aforementioned forces and energies are produced in the vortex layer. In case the rotation speed of the ferromagnetic elements is less than 2800 rpm, no metal reduction occurs, and concomitant grinding of bauxites does not take place, since in such case the system functions as a mixer.

Ferromagnetic elements made of nickel and coated with plastic increase the magnetoelastic effect by 200 times as compared to ferromagnetic elements made of various steel grades, and those made of a neodymium-iron-boron alloy cause an increase by 1000 times and more. Plastic coating of the ferromagnetic elements prevents the base metal of the ferromagnetic elements from dissolving in and transition into water carried away at the step of water treatment with a magnetic field, and transition into pulp at the step of exposing the pulp to rotating magnetic field. By virtue of the selected ferromagnetic elements, high magnetoelastic effect parameters are achieved, increasing the rate of reduction reactions by multiple times. The number of ferromagnetic elements in the reaction chamber ranges from several dozen to several thousand, in order to produce the vortex layer. Rotating ferromagnetic elements create multiple electrolytic microcells, which continuously function to emit ions having charges with different polarity (conditions for electrolysis process are provided). In the process of electrolysis, ferromagnetic elements made of nickel or of neodymium-iron-boron alloy serve as electrodes which cause hydrogen generation. The hydrogen being generated, in its turn, is a reducing agent in the system. Vortex layer machines or process activation devices are used to generate the rotating magnetic field and the vortex layer.

The length of ferromagnetic elements is defined in the range of 5 mm to 30 mm, and their diameter in the range of 1 mm to 2 mm. Use of ferromagnetic elements with the length and diameter as defined provides the maximum impact force upon a bauxite particle, and provides the maximum number of impacts onto the bauxite particles, contributing to the improved efficiency of the process of bauxite processing.

The step of separating the metal oxide mixture is preferably carried out in cyclone separators in an inert gas environment including a permissible amount of oxygen. In this case, cyclone separation in an inert gas environment has an advantage which consists in high separation rate as well as high specific capacity, efficiency, and reliability. For better safety, the step of cyclone separation is carried out in an inert gas environment in sealed containers, which include a permissible amount of oxygen. The metal oxide mixture may also be separated using other methods, such as by gravity, magnetic separation, or ultrasound.

Bauxites are added into magnetic field treated water, resulting in pulp with a viscosity of not greater than 2.25 mPas. Before that, the bauxites are ground to a particle size that is smaller than the diameter of the ferromagnetic elements. The resulting pulp is provided to a magnetic activator (a vortex layer machine or a process activation device), which is a reaction chamber that consists of a pipe of a non-magnetic material, and an inductor with a stator of asynchronous motor having a motor power of at least 3 kW with two three-phase current windings and a housing. Cylinder shaped ferromagnetic elements made of nickel and coated with plastic, or ferromagnetic elements made of neodymium-iron-boron alloy and also coated with plastic are installed within the inner cavity of the non-magnetic cylindrical pipe of the magnetic activator. The reaction chamber of a non-magnetic material may be embodied as a pipe of stainless steel grades, composites, basalt, fiberglass, glass fiber, rubber, and other materials. Supplying a three-phase current causes the rotation of magnetic field within the reaction chamber together with simultaneous rotation of ferromagnetic elements, in which magnetoelastic effects occur. The process of bauxite processing is carried out in the vortex layer produced by the ferromagnetic elements, wherein the rotation speed of the ferromagnetic elements is at least 2800 rpm. The step of exposing the pulp to the rotating magnetic field is carried out until the magnetoelastic effect occurs and the forces and energies which enable metal reduction are produced. The duration of exposing the pulp to the rotating magnetic field is defined by resulting powder granularity for the predetermined technological process, and may be 30 seconds and more, so as to obtain powders with a granulometric size in a range of 40 mm to 70 μm. As a result of processes which take place in the reaction chamber, the resulting aqueous pulp is a mechanical mixture that consists of water and chemical compounds: $Al_2O_3$, $SiO_2$, $Fe_2O_3$, $TiO_2$, MgO, CaO, $K_2O$, etc.

A mud pump is used to provide the resulting mixture to the separation step, preferably into a group of cyclone separators and centrifuges, to remove water and accumulate the resulting metal oxides in containers filled with inert gases including permissible amounts of oxygen. The removed water re-enters the processing procedure. The claimed method enables producing metal oxides without waste (red mud) generation.

EXAMPLES

The method is explained using the following examples.

Example 1. At first step, magnetic field treated water was used (resulting water has pH=7), after which it was mixed with 40 kg of bauxites into a pulp with a viscosity of 2.25 mPas, wherein before that the bauxites were ground to a particle size which was smaller than the diameter of the ferromagnetic elements. Then the pulp was exposed in a reaction chamber to a rotating magnetic field produced by rotating ferromagnetic elements, wherein this step was carried out in a vortex layer and the rotation speed of the ferromagnetic elements was 2800 rpm. The step of exposing the pulp to the rotating magnetic field was carried out until the magnetoelastic effect was achieved, and forces and energies that enable metal reduction were produced. A vortex layer machine was used to generate the rotating magnetic field. Further, 5 mm long ferromagnetic elements with a diameter of 1 mm were made of nickel and coated with plastic. After exposing the pulp to the rotating magnetic field, the step of cyclone separation of the resulting metal oxide mixture was carried out in an inert gas environment containing a permissible amount of oxygen. Bauxite processing resulted in 35.2 kg of $Al_2O_3$; 1.48 kg of $TiO_2$; 1.28 kg of $SiO_2$; 0.32 kg of $Fe_2O_3$; 0.1 kg of $K_2O$; 0.08 kg of MgO; and 1.54 kg of CaO.

Example 2. At the first step, water was treated with a magnetic field (resulting water had pH=8), after which the water was mixed with 40 kg of bauxites into a pulp having a viscosity of 2 mPas, wherein before that the bauxites were ground to a particle size which was smaller than the diameter of the ferromagnetic elements. Then the step of exposing the pulp to a rotating magnetic field generated by rotating ferromagnetic elements was carried out in a reaction chamber, wherein this step was carried out in a vortex layer and the rotation speed of the ferromagnetic elements was 3000 rpm. The step of exposing the pulp to the rotating magnetic field was carried out until the magnetoelastic effect was achieved, and forces and energies that enable metal reduction were produced. A process activation device was used to generate the rotating magnetic field. Further, 30 mm long ferromagnetic elements with a diameter of 2 mm were made of a neodymium-iron-boron alloy and coated with plastic. After exposing the pulp to the rotating magnetic field, the step of cyclone separation of the resulting metal oxide mixture was carried out in an inert gas environment containing a permissible amount of oxygen. Bauxite processing resulted in 34.8 kg of $Al_2O_3$; 1.79 kg of $TiO_2$; 1.74 kg of $SiO_2$; 0.30 kg of $Fe_2O_3$; 0.11 kg of $K_2O$; 0.09 kg of MgO; and 1.17 kg of CaO.

Thus, as the description of invention provided above shows, the technical result which consists in simplifying the process of bauxite processing while improving the efficiency of the latter is achieved.

The invention claimed is:

1. A bauxite processing method including:
   preliminarily grinding bauxites;
   mixing the bauxites as ground with magnetic field treated water into a pulp;
   exposing the pulp in a reaction chamber to a rotating magnetic field created by rotating ferromagnetic elements, wherein the pulp is processed in a vortex layer generated with the ferromagnetic elements rotating at a speed of at least 2800 rpm to achieve a magnetoelastic effect and metal reduction; and
   separating a resulting metal oxide mixture.

2. The bauxite processing method of claim 1, wherein preliminarily grinding bauxites is carried out to achieve a particle size which is smaller than a diameter of the ferromagnetic elements.

3. The bauxite processing method of claim 1, wherein a length of the ferromagnetic elements is defined in a range of 5 mm to 30 mm, and a diameter of 1 mm to 2 mm.

4. The bauxite processing method of claim 1, wherein the ferromagnetic elements are made of nickel and coated with plastic.

5. The bauxite processing method of claim 1, wherein the ferromagnetic elements are made of a neodymium-iron-boron alloy and coated with plastic.

6. The bauxite processing method of claim 1, wherein a pH value of the magnetic field treated water is at least 7 units.

7. The bauxite processing method of claim 1, wherein viscosity of the pulp is not more than 2.25 mPa s.

8. The bauxite processing method of claim 1, wherein a vortex layer machine or process activation devices are used to generate the rotating magnetic field and the vortex layer.

9. The bauxite processing method of claim 1, wherein separating the resulting metal oxide mixture is carried out in cyclone separators.

10. The bauxite processing method of claim 9, wherein cyclone separation is carried out in an inert gas environment in sealed containers.

* * * * *